US012245034B2

(12) United States Patent
Mataic et al.

(10) Patent No.: US 12,245,034 B2
(45) Date of Patent: Mar. 4, 2025

(54) SECURE AND TRUSTED PEER-TO-PEER OFFLINE COMMUNICATION SYSTEMS AND METHODS

(71) Applicant: Volvo Car Corporation, Gothenburg (SE)

(72) Inventors: Petar Mataic, Gothenburg (SE); Soeren Reimler, Gothenburg (SE); Niclas Gyllenram, San Francisco, CA (US); Jeremy White, San Jose, CA (US)

(73) Assignee: Volvo Car Corporation, Sweden (SE)

( * ) Notice: Subject to any disclaimer, the term of this patent is extended or adjusted under 35 U.S.C. 154(b) by 410 days.

(21) Appl. No.: 17/743,595

(22) Filed: May 13, 2022

(65) Prior Publication Data

US 2022/0377550 A1 Nov. 24, 2022

Related U.S. Application Data

(60) Provisional application No. 63/190,258, filed on May 19, 2021.

(51) Int. Cl.
*H04W 12/069* (2021.01)
*H04W 4/40* (2018.01)
*H04W 76/40* (2018.01)

(52) U.S. Cl.
CPC ........... *H04W 12/069* (2021.01); *H04W 4/40* (2018.02); *H04W 76/40* (2018.02)

(58) Field of Classification Search
CPC ...... H04W 12/069; H04W 4/40; H04W 76/40
USPC ....................................................... 455/411
See application file for complete search history.

(56) References Cited

U.S. PATENT DOCUMENTS

| 10,771,252 B1* | 9/2020 | Teng .................. H04L 9/0897 |
| 2015/0046697 A1* | 2/2015 | Galpin ................ H04L 9/3247 |
| | | 713/155 |
| 2018/0152824 A1 | 5/2018 | Baker et al. |

(Continued)

OTHER PUBLICATIONS

Oct. 5, 2022 European Search Report issued in Corresponding International Application No. 22173555.

*Primary Examiner* — Ted M Wang
(74) *Attorney, Agent, or Firm* — Clements Bernard Walker; Christopher L. Bernard

(57) ABSTRACT

A peer-to-peer offline communication method, including: at a mobile device executing a mobile device communication application, generating a mobile device certificate signing request and sending the mobile device certificate signing request to a cloud server; at the mobile device communication application, receiving a signed mobile device certificate from the cloud server; at a vehicle executing a vehicle communication application, generating a vehicle certificate signing request and sending the vehicle certificate signing request to the cloud server; at the vehicle communication application, receiving a signed vehicle certificate from the cloud server; broadcasting the presence of the mobile device and discovering the presence of the mobile device at the vehicle; exchanging and verifying the signed certificate signing requests between the mobile device communication application and the vehicle communication application; and encrypting and decrypting data exchanged between the mobile device and the vehicle.

20 Claims, 6 Drawing Sheets

(56) References Cited

U.S. PATENT DOCUMENTS

2018/0191510 A1 7/2018 Batten
2018/0302228 A1 10/2018 Hergesheimer

* cited by examiner

SECURE AND TRUSTED PEER-TO-PEER OFFLINE COMMUNICATION SYSTEMS AND METHODS

CROSS-REFERENCE TO RELATED APPLICATION

The present disclosure claims the benefit of priority of U.S. Provisional Patent Application No. 63/190,258, filed on May 19, 2021, and entitled "SECURE AND TRUSTED PEER-TO-PEER OFFLINE COMMUNICATION SYSTEMS AND METHODS," the contents of which are incorporated in full by reference herein.

TECHNICAL FIELD

The present disclosure relates generally to secure and trusted peer-to-peer offline communication systems and methods that may be used to couple a user device to a vehicle, for example.

BACKGROUND

Due to limitations of the Bluetooth (Bluetooth Special Interest Group (SIG)) stack on the Apple (Apple Inc.) iOS platform, for example, and a lack of clear standardization for wireless peer-to-peer communication between different platforms, a new manner of communicating and verifying devices using existing, but non-purpose-built, Bluetooth-type standards is needed.

This background is provided as an illustrative contextual environment only. It will be readily apparent to those of ordinary skill in the art that the systems and methods of the present disclosure may be implemented in other contextual environments as well.

SUMMARY

The present disclosure provides secure and trusted peer-to-peer offline communication systems and methods that may be used to couple a user device to a vehicle, for example. These systems and methods do not rely on having a connection to the internet on both devices to be able to communicate with each other, and do not require a Bluetooth pairing. A Bluetooth pairing would make the communication encrypted and protected, but all ubiquitous platforms prompt a user to confirm the pairing. The systems and methods use certificates that have been signed at a prior time when the user has been connected to the internet and logged in to an account for the purpose of verification of trust.

In one illustrative embodiment, the present disclosure provides a peer-to-peer offline communication method, including: at a mobile device executing a mobile device communication application, generating a mobile device certificate signing request and sending the mobile device certificate signing request to a cloud server; at the mobile device executing the mobile device communication application, receiving a signed mobile device certificate signing request from the cloud server; at a vehicle executing a vehicle communication application, generating a vehicle certificate signing request and sending the vehicle certificate signing request to the cloud server; at the vehicle executing the vehicle communication application, receiving a signed vehicle certificate signing request from the cloud server; broadcasting the presence of the mobile device and discovering the presence of the mobile device at the vehicle; exchanging and verifying the signed mobile device certificate signing request and the signed vehicle certificate signing request between the mobile device communication application and the vehicle communication application; and encrypting and decrypting data exchanged between the mobile device and the vehicle.

In another illustrative embodiment, the present disclosure provides a peer-to-peer offline communication system, including: a mobile device communication application stored in a memory and executed by a processor of a mobile device to generate a mobile device certificate signing request and send the mobile device certificate signing request to a cloud server; the mobile device communication application operable for receiving a signed mobile device certificate signing request from the cloud server; a vehicle communication application stored in a memory and executed by a processor of a vehicle to generate a vehicle certificate signing request and send the vehicle certificate signing request to the cloud server; the vehicle communication application operable for receiving a signed vehicle certificate signing request from the cloud server; a communication link between the mobile device and the vehicle operable for broadcasting the presence of the mobile device and discovering the presence of the mobile device at the vehicle; the communication link operable for exchanging and verifying the signed mobile device certificate signing request and the signed vehicle certificate signing request between the mobile device communication application and the vehicle communication application; and a public key/private key system operable for encrypting and decrypting data exchanged between the mobile device and the vehicle.

In a further illustrative embodiment, the present disclosure provides a non-transitory computer readable medium stored in one or more memories and including peer-to-peer offline communication instructions executed by one or more processors, the peer-to-peer offline communication instructions including: at a mobile device executing a mobile device communication application, generating a mobile device certificate signing request and sending the mobile device certificate signing request to a cloud server; at the mobile device executing the mobile device communication application, receiving a signed mobile device certificate signing request from the cloud server; at a vehicle executing a vehicle communication application, generating a vehicle certificate signing request and sending the vehicle certificate signing request to the cloud server; at the vehicle executing the vehicle communication application, receiving a signed vehicle certificate signing request from the cloud server; broadcasting the presence of the mobile device and discovering the presence of the mobile device at the vehicle; exchanging and verifying the signed mobile device certificate signing request and the signed vehicle certificate signing request between the mobile device communication application and the vehicle communication application; and encrypting and decrypting data exchanged between the mobile device and the vehicle.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

Figure 1:
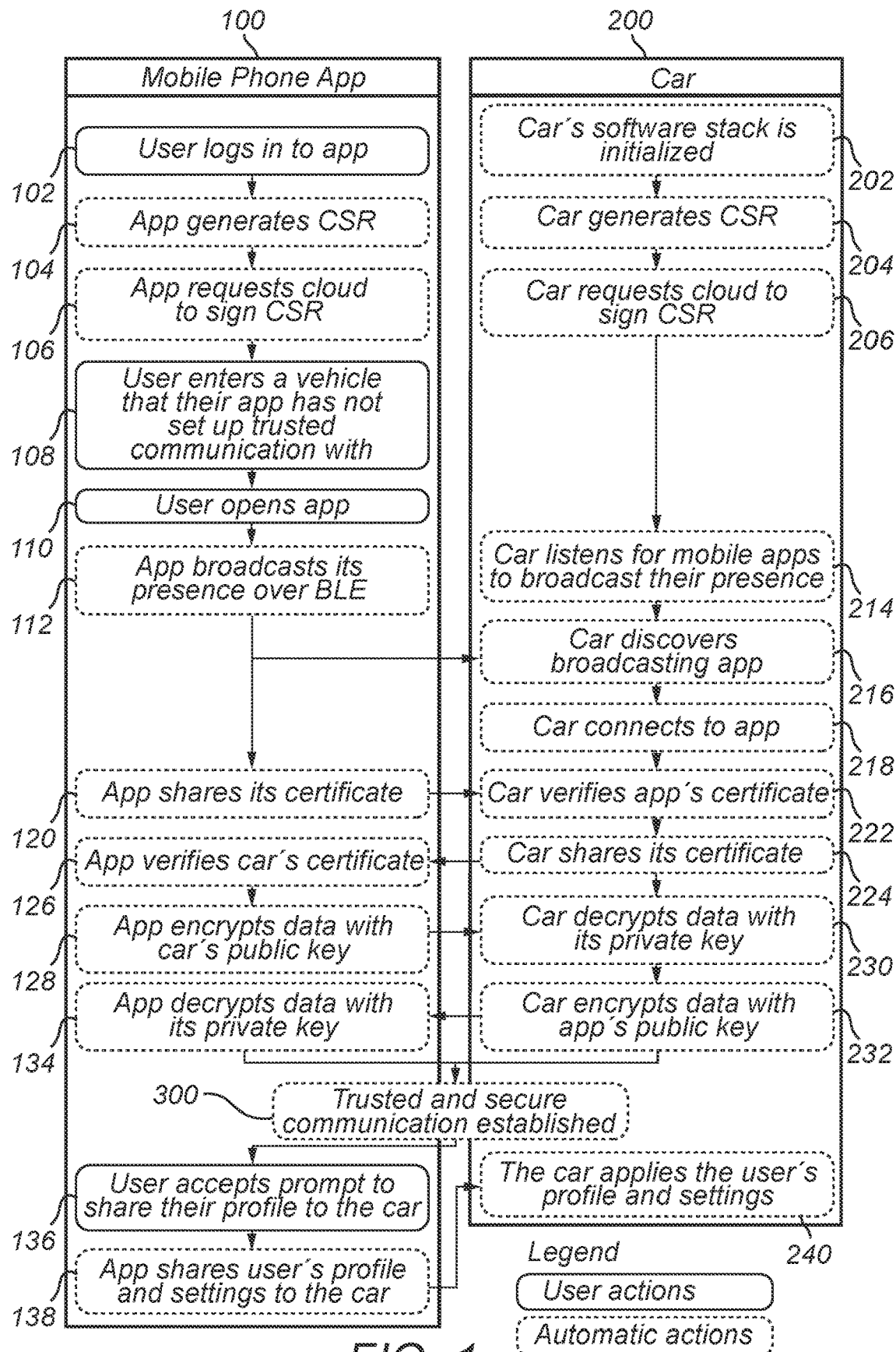
FIG. 1 is a flowchart showing one illustrative embodiment of the workflow of the present disclosure.

Again, the present disclosure provides secure and trusted peer-to-peer offline communication systems and methods that may be used to couple a user device to a vehicle, for example. These systems and methods do not rely on having a connection to the internet on both devices to be able to communicate with each other, and do not require a Bluetooth pairing. A Bluetooth pairing would make the communication encrypted and protected, but all ubiquitous platforms prompt a user to confirm the pairing. The systems and methods use certificates that have been signed at a prior time when the user has been connected to the internet and logged in to an account for the purpose of verification of trust. Most conventional wisdom would enable such communication over the internet via a trusted server. The present disclosure secures and trusts communication in a peer-to-peer manner.

As an initial matter, the following terms and definitions are used herein:

API—Application Programming Interface—A computing interface that defines interactions between multiple software intermediaries.

Byte—A unit of digital information consisting of a series of generally 8 bits.

BLE—Bluetooth Low Energy—A wireless personal area network technology independent of classic Bluetooth.

Central role—BLE device acting as a central, one that discovers nearby peripherals and connects to them.

Peripheral role—BLE device that is broadcasting its presence and advertises its capabilities through a hierarchy of GATT attributes.

GATT—Generic Attribute Profile—An API to interface with other physical BLE devices.

Certificate—x.509 certificate—A digital certificate that certifies the ownership of a public key by the named subject of the certificate.

CSR—Certificate Signing Request—A way to request a certificate authority to issue a signed certificate. See RFC.2386 for technical details.

CA—Certificate Authority—In cryptography, it is an entity that issues digital certificates.

Socket—A network socket is a software structure within a network node of a computer network that serves as an endpoint for sending and receiving data across the network.

Public key—See Public-key cryptography.

Private key—See Private-key cryptography.

Public-key and Private-key cryptography—Also known as asymmetric cryptography, is a cryptographic system which uses pairs of keys, public keys (which may be known to others), and private keys (which may never be known by any except the owner). What is encrypted using the public key can only be decrypted by the private key pair of that same public key.

UUID—Universally Unique Identifier—A 128-bit number used to identify information in computer systems.

VLQ—Variable Length Quantity—A way to digitally store integers in a computer system which takes up a varying amount of storage space depending on the size of the number.

MTU—Maximum Transmission Unit—The size of the largest protocol data unit that can be communicated in a single network layer transaction.

At a high level, the purpose of the present disclosure is to be able to have an app on a mobile device establish a secure and trusted peer-to-peer connection without requiring the internet or other intermediate layers. The primary purpose is to share the user's profile and settings to a vehicle, for example. This would allow for the streamlining of the on-boarding process. Many users today are more comfortable inputting data and making preference selections on their highly-personal mobile phones. When they get into a new vehicle for the first time, they want to drive and go places, not have to spend too many minutes typing in their credentials, agreeing to terms, and making changes to settings. Profile data and settings might include, but are not limited to, user credentials to services and vehicle preferences. By transferring user credentials, the user can access data like, for example, calendars, map locations (home, work, favorites, etc.), contacts, and messages. The biggest reason to do this offline is that not everyone has internet connectivity everywhere. Many people live in apartments and have underground garages with uncertain levels of wireless service. The user should not have to first drive their vehicle to a location where both the vehicle and their device has an adequate level of wireless service. The process should be seamless and just work.

Currently, there are no established, free, and well-adopted standards for wireless offline peer-to-peer connectivity between devices of differing operating systems and platforms. Current standards include Wi-Fi Direct, classic Wi-Fi, classic Bluetooth, Bluetooth Low Energy (BLE), Google (Google LLC) Nearby Connections, Apple Multipeer Connectivity framework, and Apple Made for iPhone/iPod/iPad (MFi) iAP2. None are perfectly suited for the requirements. Wi-Fi Direct is not implemented by Apple on their iOS line of operating systems and cannot be used there. Classic Wi-Fi poses user experience challenges due to the user having to make active choices on some platforms to join specific networks. Google Nearby Connections also does not have full support on Apple's iOS line of operating systems. Apple Multipeer Connectivity framework is proprietary and is not supported on the Android line of operating systems. While Apple's MFI iAP2 can be implemented on Android, it requires licensing from Apple. The use of classic Bluetooth is limited on the iOS line of operating systems from Apple and is also not suitable (Apple limits the use of classic Bluetooth to standard profiles and the MFi iAP2 program). There is one that is widely supported on multiple different operating systems and platforms and does not require special licensing, which is BLE. BLE comes with its own limitations and challenges. While it builds on top of Logical Link Control and Adaptation Protocol (L2CAP), Apple does not expose the necessary APIs to read and write directly to an L2CAP socket. BLE GATT is the only established and widely adopted standard that can be reliably used across multiple different operating systems and platforms. It does not come without its own caveats. GATT consists of a hierarchy of one peripheral advertising its presence and optionally specific advertising messages. One peripheral can have no or many services. A service, in turn, can have no or many characteristics. Characteristics, in turn, can have different properties, such as read, write, and notify. A central that is connected to a peripheral can either read a characteristic's value, write to it, or subscribe to be notified of any changes to the value. GATT Characteristic's values are limited in size, which varies on different platforms. The size limitation is generally below 512 bytes.

Figure 2:
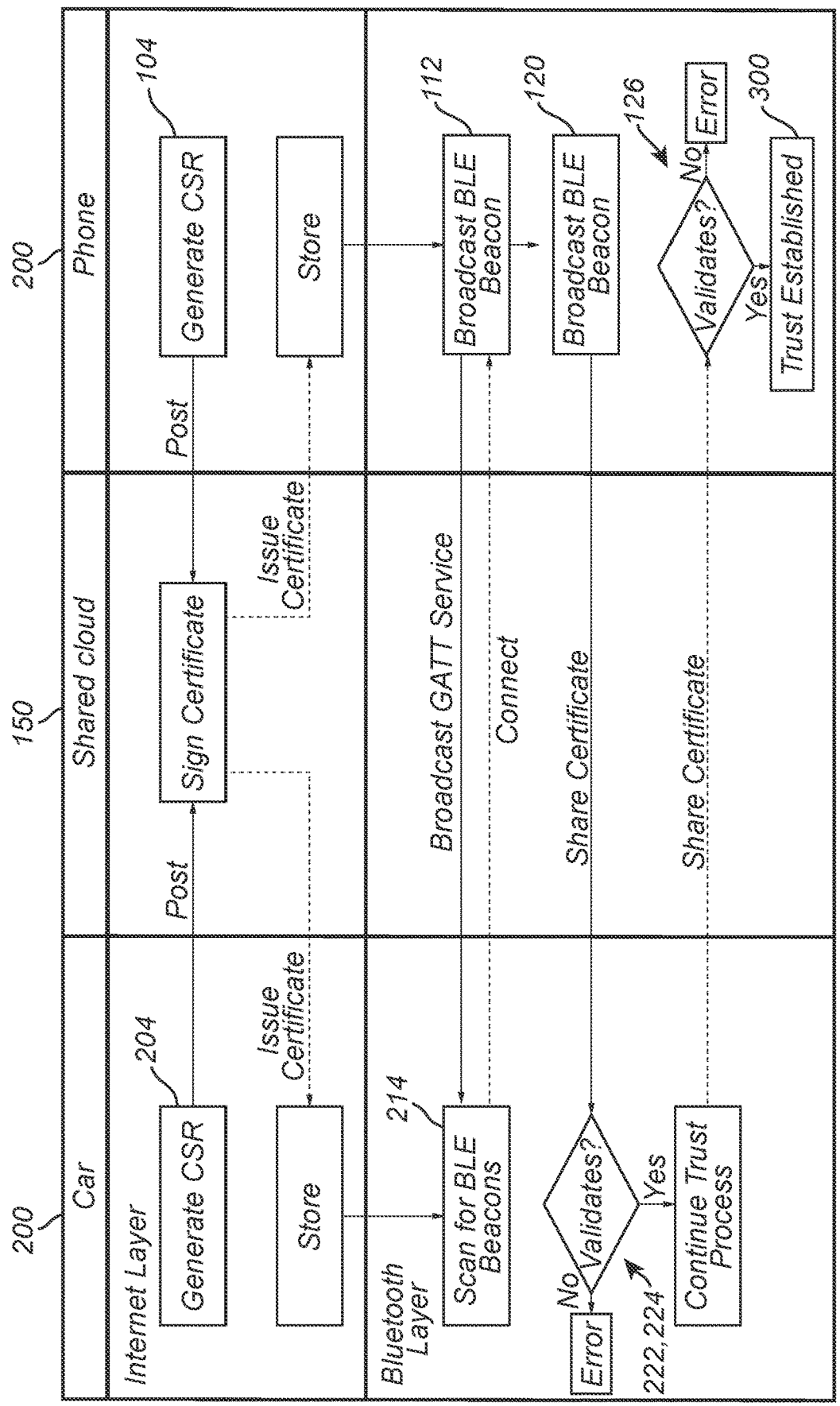
FIG. 2 is a flowchart showing another illustrative embodiment of the workflow of the present disclosure.

Referring now to FIGS. 1 and 2, in accordance with the present disclosure, the user logs in to their mobile device app 100, 102. After logging in, the app will create a CSR on the user's mobile device 104. Following that, it will send that CSR to a trusted CA server that will validate the request and the user's credentials 106. If everything checks out, it will sign the app's CSR and return the certificate together with its own certificate. In parallel, the vehicle will perform the same operation 200. At some point, when its computer systems are initialized and it is connected to the internet 202, it will create a CSR and send a request to the same trusted CA server that will validate the request and the vehicle's credentials 204, 206. If everything checks out, it will sign the CSR and return the certificate together with its own certificate. This is the only part of the process that does require internet connectivity for both devices, with each being coupled to the trusted CA server in the cloud 150.

At a later time, the user will enter the vehicle, carrying with them their mobile device with the relevant app installed 108. When they open the app 110, it will start broadcasting its presence over BLE 112. Whenever the vehicle's computer systems are operational, they will be scanning for devices broadcasting a specific GATT service 214. Once the vehicle finds a device broadcasting the specified service it will attempt to connect to it 216. When the connection is established, 218, the device app will share its certificate with the vehicle 120. The vehicle will use its own certificate to validate the trust of the certificate it had received from the mobile device app 222. This process is possible because the certificates the devices receive from the CA server contain a chain of certificates including both their own issued certificates, but also the issuing CA's certificate. Since it is the same CA that has signed and issued both the vehicle's and the device app's certificate, the vehicle can use the CA's certificate to cryptographically validate the authenticity of the mobile app's received certificate. If the mobile device app's certificate validates successfully, the vehicle then proceeds to share its own certificate to the mobile app 224. The mobile app then repeats the process of validation 126. If that process validates, they can start using each other's respective public keys that are stored in the certificates to encrypt messages to send to each other.

Specifically, the app encrypts data sent to the vehicle with the vehicle's public key 128 and the vehicle decrypts the data with its private key 230. The vehicle encrypts data sent to the app with the app's public key 232 and the app decrypts the data with its private key 134. Thus, trusted and secure communication between the app and the vehicle is established without the need for an active internet connection 300.

At this point, the user of the mobile device will be asked to confirm that they would like to share their profile data to the vehicle 136. Once confirmed, the mobile device app can encrypt all necessary data and transfer it to the vehicle 138, where the vehicle can apply the profile data and the user does not need to enter credentials on the vehicle's interface 240.

Figure 3:
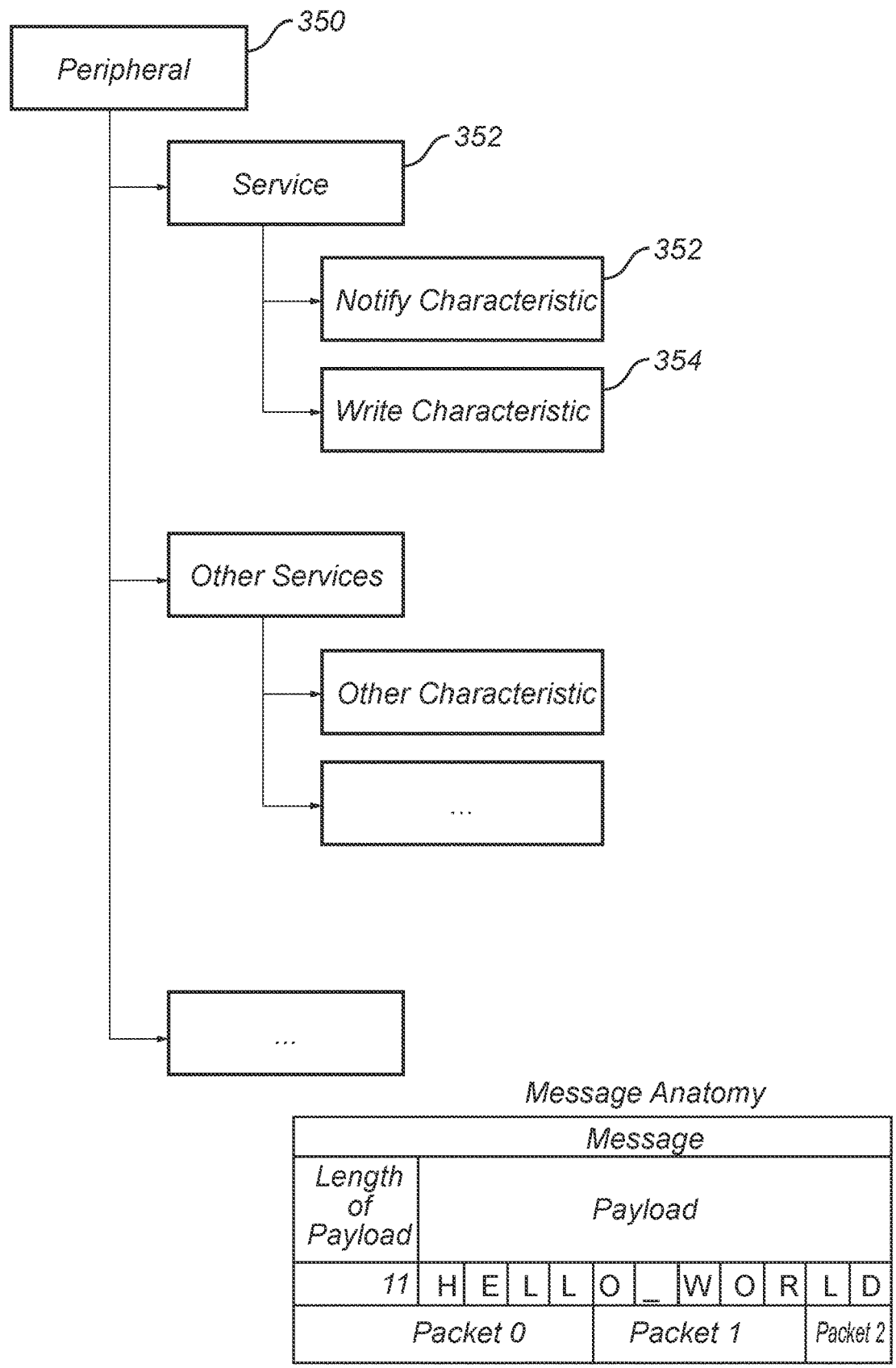
FIG. 3 is a schematic diagram showing one illustrative embodiment of a Bluetooth Low Energy (BLE) topography of the present disclosure, as well as one illustrative embodiment of an associated message that is fragmented into multiple packages.

Referring now to FIG. 3, in accordance with the present disclosure, the mobile device app will start advertising its presence over BLE by setting itself up as a peripheral 350. BLE Peripherals allow for additional data to be included in the advertisement package. This data can be used by centrals for filtering of peripherals of interest. The peripheral will configure one service with the specific UUID 352. On that same service, two characteristics will be configured with their own respective specific UUID's. One with a write only property (W characteristic 354) and the other with a notify only property (N characteristic 356). The vehicle will then enter the central role and start scanning for peripherals 350 that are advertising using the UUID of the service 352. Once found and connected to, the central will discover the necessary topography to make sure that the peripheral 350 exposes the necessary service 352 and characteristics associated 354, 356. Once fully discovered, the central can then subscribe to notifications from the peripheral 350 on the N characteristic 356. By updating the value of the N characteristic 356, the peripheral 350 can send data to the central. As the value is updated on the N characteristic 356, a notify event is sent to the central who receives the new and updated value for the N characteristic 356. For sending data from the central to the peripheral 350, the central needs to write said data to the W characteristic 354. Once written to, the peripheral 350 will receive an event informing it of the updated value. For the purposes of a computer network, the write and notify characteristics 354, 356 can be seen as read and write sockets. As the values sent and received on the characteristics 354, 356 are limited in size, fragmentation and defragmentation of messages might be necessary. Before sending a value, the sending party must first calculate the length in bytes of the intended message. It must also inspect the current BLE connections MTU. If the messages length in bytes plus two bytes exceeds the MTU, the message needs to be fragmented into multiple packages (see illustrative message in FIG. 3). The two extra bytes necessary in addition to the message length is needed for the length specifier. The length specifier will inform the receiving end for how many bytes the message consists of. It is encoded using the VLQ standard to use as little space as possible. For a message of length 510 bytes (512 minus 2 bytes), the VLQ requires two bytes. The length specifier will be prepended to the first packet of the message. Upon receiving a new value, the receiver will first decode the length specifier to inform how many more bytes it should append to be able to defragment the entire message. Once it has read and appended the necessary bytes it can stop and await the next message.

Thus, at a high level, the present disclosure uses a common server to issue certificates to both a vehicle (when new, for example) and a mobile device, when internet service is readily available. BLE is then used for later automatic device discovery and certificate exchange and verification, without the need for the internet. There is no explicit pairing or code exchange, which makes this process seamless to a user.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 4:
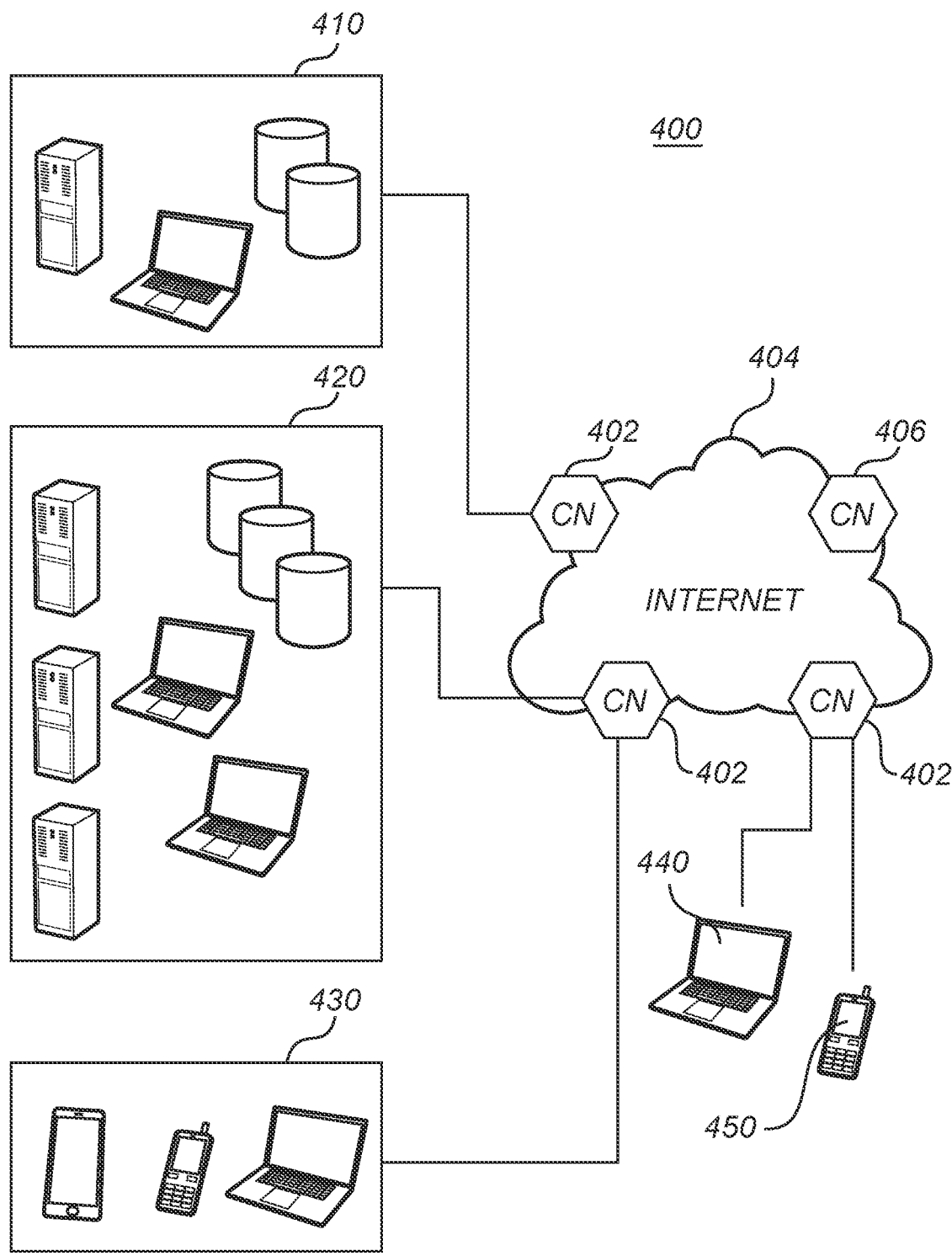
FIG. 4 is a network diagram of a cloud-based system for implementing various cloud-based services of the present disclosure, as appropriate.
Figure 5:
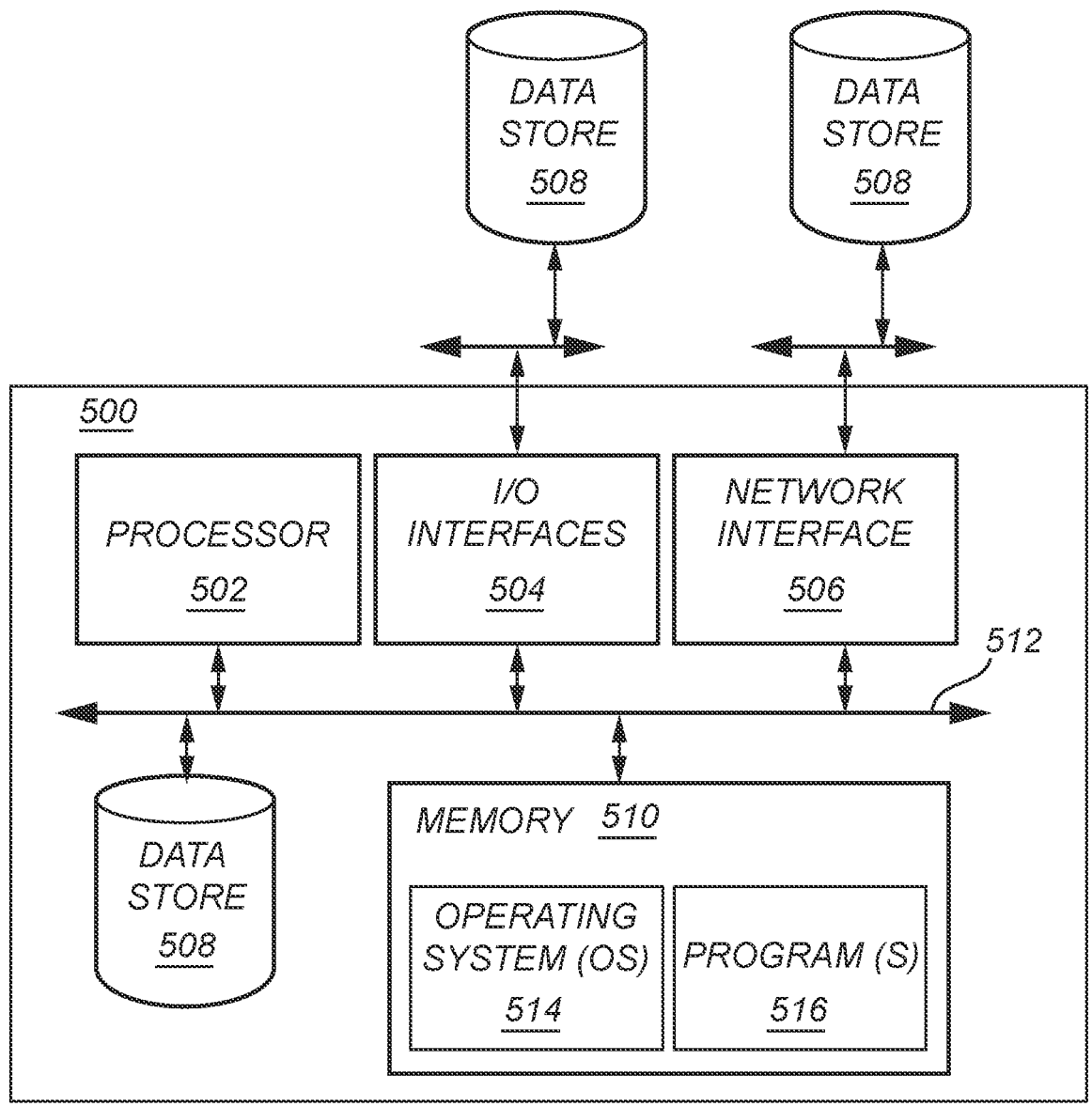
FIG. 5 is a block diagram of a server that may be used in the cloud-based system of FIG. 4 or stand-alone, as appropriate.

FIG. 4 is a network diagram of a cloud-based system 400 for implementing various cloud-based services of the present disclosure, as appropriate. The cloud-based system 400 includes one or more cloud nodes (CNs) 402 communicatively coupled to the Internet 404 or the like. The cloud nodes 402 may be implemented as a server 500 (as illustrated in FIG. 5) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 5 is a block diagram of a server 500, which may be used in the cloud-based system 400 (FIG. 4), in other systems, or stand-alone, as appropriate. For example, the CNs 402 (FIG. 4) and the central authority nodes 406 (FIG. 4) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 4). The network interface 506 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
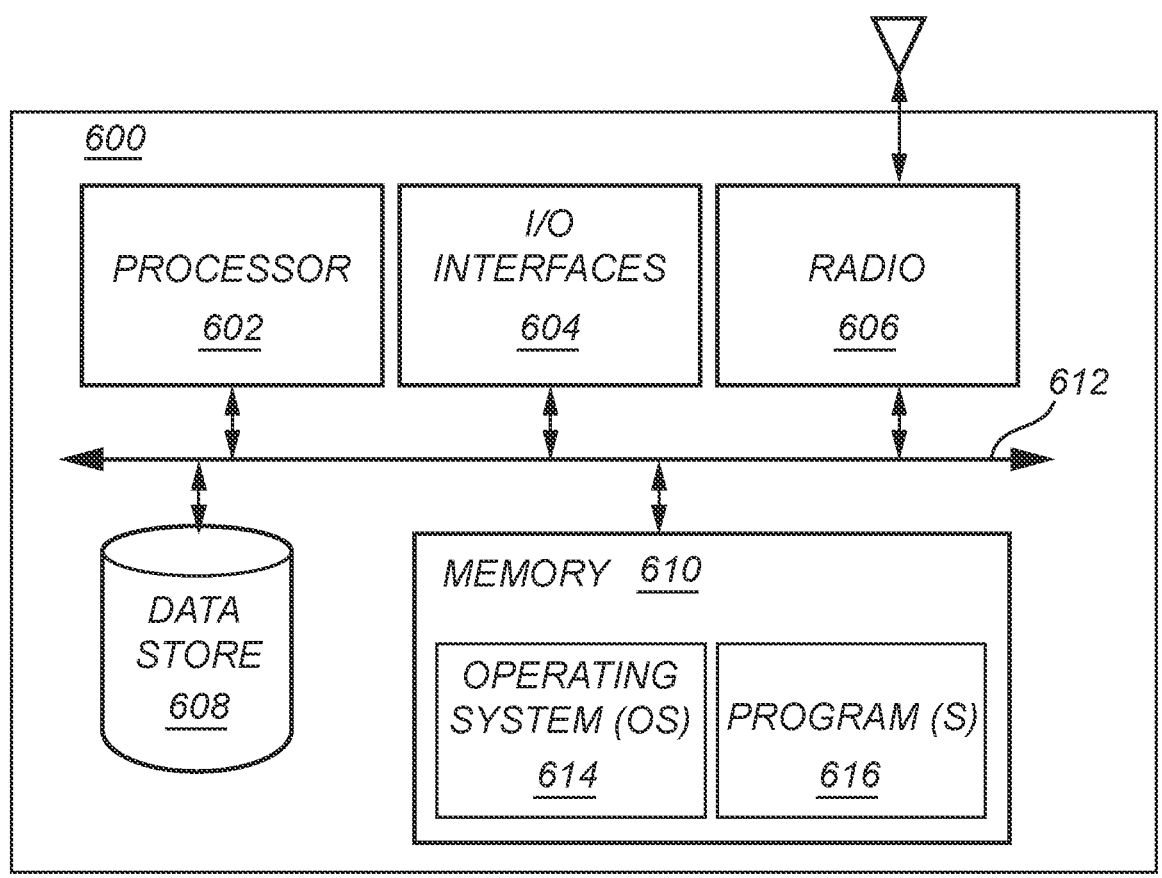
FIG. 6 is a block diagram of a vehicle or user device that may be used in the cloud-based system of FIG. 4 or stand-alone, as appropriate.

FIG. 6 is a block diagram of a vehicle or user device 600, which may be used in the cloud-based system 400 (FIG. 4), as part of a network, or stand-alone, as appropriate. Again, the user device 600 can be a vehicle, a smartphone, a tablet, a smartwatch, an Internet of Things (IoT) device, a laptop, a virtual reality (VR) headset, etc. The user device 600 can be a digital device that, in terms of hardware architecture, generally includes a processor 602, I/O interfaces 604, a radio 606, a data store 608, and memory 610. It should be appreciated by those of ordinary skill in the art that FIG. 6 depicts the user device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the user device 600, a semiconductor-based microprocessor (in the form of a microchip or chipset), or generally any device for executing software instructions. When the user device 600 is in operation, the processor 602 is configured to execute software stored within the memory 610, to communicate data to and from the memory 610, and to generally control operations of the user device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 6, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the user device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network, such as the cloud-based system 400 (FIG. 4).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A peer-to-peer offline communication method, comprising:
   at a mobile device executing a mobile device communication application, generating a mobile device certificate signing request, sending the mobile device certificate signing request to a cloud server, and receiving a signed mobile device certificate from the cloud server responsive to the mobile device certificate signing request;
   at a vehicle executing a vehicle communication application, generating a vehicle certificate signing request, sending the vehicle certificate signing request to the cloud server, and receiving a signed vehicle certificate from the cloud server responsive to the vehicle certificate signing request;
   broadcasting presence of the mobile device and discovering the presence of the mobile device at the vehicle;
   exchanging and verifying the signed mobile device certificate and the signed vehicle certificate between the mobile device communication application and the vehicle communication application to establish secure and trusted communication directly between the mobile device and the vehicle prior to data exchange between the mobile device and the vehicle, without user-approved pairing or code exchange between the mobile device and the vehicle; and
   using the exchanged and verified signed mobile device certificate and signed vehicle certificate, encrypting and decrypting data exchanged between the mobile device and the vehicle.

2. The method of claim 1, wherein sending the mobile device certificate signing request to the cloud server and receiving the signed mobile device certificate from the cloud server responsive to the mobile device certificate signing request is performed while an internet connection is available to the mobile device.

3. The method of claim 1, wherein sending the vehicle certificate signing request to the cloud server and receiving the signed vehicle certificate from the cloud server responsive to the vehicle certificate signing request is performed while an internet connection is available to the vehicle.

4. The method of claim 1, wherein exchanging and verifying the signed mobile device certificate and the signed vehicle certificate between the mobile device communication application and the vehicle communication application and, using the exchanged and verified signed mobile device certificate and signed vehicle certificate, encrypting and decrypting the data exchanged between the mobile device and the vehicle is performed on a peer-to-peer basis not using an internet connection.

5. The method of claim 1, wherein the data exchanged between the mobile device and the vehicle comprises user profile and vehicle setting information.

6. The method of claim 5, further comprising, at the vehicle, implementing a vehicle setting responsive to the user profile and vehicle setting information.

7. The method of claim 6, further comprising communicating the implemented vehicle setting to the mobile device as further data exchanged between the mobile device and the vehicle.

8. A peer-to-peer offline communication system, comprising:
   a mobile device communication application stored in a memory and executed by a processor of a mobile device to generate a mobile device certificate signing request, send the mobile device certificate signing request to a cloud server, and receive a signed mobile device certificate from the cloud server responsive to the mobile device certificate signing request;
   a vehicle communication application stored in a memory and executed by a processor of a vehicle to generate a vehicle certificate signing request, send the vehicle certificate signing request to the cloud server, and receive a signed vehicle certificate from the cloud server responsive to the vehicle certificate signing request;
   a communication link between the mobile device and the vehicle operable for broadcasting the presence of the mobile device and discovering the presence of the mobile device at the vehicle;
   the communication link operable for exchanging and verifying the signed mobile device certificate signing request and the signed vehicle certificate signing request between the mobile device communication application and the vehicle communication application to establish secure and trusted communication directly between the mobile device and the vehicle prior to data exchange between the mobile device and the vehicle, without user-approved pairing or code exchange between the mobile device and the vehicle; and
   a public key/private key system operable for, using the exchanged and verified signed mobile device certificate and signed vehicle certificate, encrypting and decrypting data exchanged between the mobile device and the vehicle.

9. The system of claim 8, wherein sending the mobile device certificate signing request to the cloud server and receiving the signed mobile device certificate from the cloud server responsive to the mobile device certificate signing request is performed while an internet connection is available to the mobile device.

10. The system of claim 8, wherein sending the vehicle certificate signing request to the cloud server and receiving the signed vehicle certificate from the cloud server responsive to the vehicle certificate signing request is performed while an internet connection is available to the vehicle.

11. The system of claim 8, wherein exchanging and verifying the signed mobile device certificate and the signed vehicle certificate between the mobile device communication application and the vehicle communication application and, using the exchanged and verified signed mobile device certificate and signed vehicle certificate, encrypting and decrypting the data exchanged between the mobile device and the vehicle is performed on a peer-to-peer basis not using an internet connection.

12. The system of claim 8, wherein the data exchanged between the mobile device and the vehicle comprises user profile and vehicle setting information.

13. The system of claim 8, further comprising a vehicle control system operable for implementing a vehicle setting responsive to the user profile and vehicle setting information.

14. The system of claim 13, the communication link further operable for communicating the implemented vehicle setting to the mobile device as further data exchanged between the mobile device and the vehicle.

15. A non-transitory computer readable medium stored in one or more memories and comprising peer-to-peer offline communication instructions executed by one or more processors, the peer-to-peer offline communication instructions comprising steps for:
- at a mobile device executing a mobile device communication application, generating a mobile device certificate signing request, sending the mobile device certificate signing request to a cloud server, and receiving a signed mobile device certificate from the cloud server responsive to the mobile device certificate signing request;
- at a vehicle executing a vehicle communication application, generating a vehicle certificate signing request, sending the vehicle certificate signing request to the cloud server, and receiving a signed vehicle certificate from the cloud server responsive to the vehicle certificate signing request;
- broadcasting presence of the mobile device and discovering the presence of the mobile device at the vehicle;
- exchanging and verifying the signed mobile device certificate and the signed vehicle certificate between the mobile device communication application and the vehicle communication application to establish secure and trusted communication directly between the mobile device and the vehicle prior to data exchange between the mobile device and the vehicle, without user-approved pairing or code exchange between the mobile device and the vehicle; and
- using the exchanged and verified signed mobile device certificate and signed vehicle certificate, encrypting and decrypting data exchanged between the mobile device and the vehicle.

16. The non-transitory computer readable medium of claim 15, wherein sending the mobile device certificate signing request to the cloud server and receiving the signed mobile device certificate from the cloud server responsive to the mobile device certificate signing request is performed while an internet connection is available to the mobile device.

17. The non-transitory computer readable medium of claim 15, wherein sending the vehicle certificate signing request to the cloud server and receiving the signed vehicle certificate from the cloud server responsive to the vehicle certificate signing request is performed while an internet connection is available to the vehicle.

18. The non-transitory computer readable medium of claim 15, wherein exchanging and verifying the signed mobile device certificate and the signed vehicle certificate between the mobile device communication application and the vehicle communication application and, using the exchanged and verified signed mobile device certificate and signed vehicle certificate, encrypting and decrypting the data exchanged between the mobile device and the vehicle is performed on a peer-to-peer basis not using an internet connection.

19. The non-transitory computer readable medium of claim 15, wherein the data exchanged between the mobile device and the vehicle comprises user profile and vehicle setting information.

20. The non-transitory computer readable medium of claim 19, the steps further comprising, at the vehicle, implementing a vehicle setting responsive to the user profile and vehicle setting information.

* * * * *